US009635246B2

(12) United States Patent
Shroff et al.

(10) Patent No.: US 9,635,246 B2
(45) Date of Patent: Apr. 25, 2017

(54) SYSTEMS AND METHODS TO SUPER RESOLVE A USER-SELECTED REGION OF INTEREST

(71) Applicant: QUALCOMM Incorporated, San Diego, CA (US)

(72) Inventors: Nitesh Shroff, San Diego, CA (US); Ramin Rezaiifar, Del Mar, CA (US); Chiachi Sung, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 5 days.

(21) Appl. No.: 14/309,551

(22) Filed: Jun. 19, 2014

(65) Prior Publication Data

US 2014/0375865 A1    Dec. 25, 2014

Related U.S. Application Data

(60) Provisional application No. 61/838,144, filed on Jun. 21, 2013.

(51) Int. Cl.
*H04N 5/222* (2006.01)
*H04N 5/232* (2006.01)
*G06T 5/00* (2006.01)
*G06T 3/40* (2006.01)

(52) U.S. Cl.
CPC ....... *H04N 5/23216* (2013.01); *G06T 3/4053* (2013.01); *G06T 5/00* (2013.01)

(58) Field of Classification Search
USPC .................................................. 348/333.12
See application file for complete search history.

(56) References Cited

U.S. PATENT DOCUMENTS

| 7,058,239 | B2 | 6/2006 | Singh et al. |
| 7,523,078 | B2 | 4/2009 | Peot et al. |
| 7,817,834 | B2 | 10/2010 | Bernhardt et al. |
| 9,047,684 | B2 | 6/2015 | Lelescu et al. |
| 9,049,367 | B2 | 6/2015 | Venkataraman et al. |
| 2005/0096084 | A1* | 5/2005 | Pohja et al. ............... 455/556.1 |

(Continued)

FOREIGN PATENT DOCUMENTS

WO    WO-200912644 A1    10/2009

OTHER PUBLICATIONS

Ahmad T., et al., "An Integrated Interpolation-based Super Resolution Reconstruction Algorithm for Video Surveillance", Journal of Communications, vol. 7, No. 6, Jun. 1, 2012, pp. 464-472.

(Continued)

*Primary Examiner* — Stephen Coleman
(74) *Attorney, Agent, or Firm* — Kilpatrick Townsend & Stockton LLP

(57) ABSTRACT

Systems, devices, and methods are described for efficiently super resolving a portion of an image. One embodiment involves capturing, using a camera module of a device, at least one image of a scene, and creating a higher resolution image of a user-selected region of interest. The super resolution of the region of interest may be performed by matching a high resolution grid with a grid that is at the resolution of a device camera, populating the high resolution grid with information from an image from the camera, and then populating the remaining points of the grid that are not yet populated.

26 Claims, 8 Drawing Sheets

(56) References Cited

U.S. PATENT DOCUMENTS

| | | | |
|---|---|---|---|
| 2005/0213833 A1 | 9/2005 | Okada et al. | |
| 2007/0097268 A1* | 5/2007 | Relan et al. | 348/584 |
| 2009/0189900 A1* | 7/2009 | Furukawa et al. | 345/428 |
| 2009/0256947 A1 | 10/2009 | Ciurea et al. | |
| 2010/0020222 A1* | 1/2010 | Jones | G06F 3/04883 |
| | | | 348/333.02 |
| 2012/0007866 A1* | 1/2012 | Tahan | G06F 19/321 |
| | | | 345/428 |
| 2012/0306768 A1* | 12/2012 | Bailey | 345/173 |

OTHER PUBLICATIONS

International Search Report and Written Opinion—PCT/US2014/ 043472—ISA/EPO—Nov. 5, 2014.
Irani M., et al., "Improving Resolution by Image Registration", CVGIP Graphical Models and Image Processing, Academic Press, vol. 53, No. 3, May 1, 1991, pp. 231-239, XP000200576.
Jiji C V., et al., "Single frame image super-resolution: should we process locally or globally?", Multidimensional Systems and Signal Processing, vol. 18. No. 2-3, Mar. 6, 2007, pp. 123-152, XP019506579.
Zhang L., et al., "A super-resolution reconstruction algorithm for surveillance images", Signal Processing, vol. 90, No. 3, Mar. 1, 2010 (Mar. 1, 2010), pp. 848-859, XP026748111.
Farsiu S., et al., "Fast and Robust Multiframe Super Resolution", IEEE Transactions on Image Processing, vol. 13, No. 10, Oct. 2004, pp. 1327-1344.

\* cited by examiner

SYSTEMS AND METHODS TO SUPER RESOLVE A USER-SELECTED REGION OF INTEREST

CROSS-REFERENCE TO RELATED APPLICATIONS

This application claims the benefit of U.S. Provisional Application No. 61/838,144, filed Jun. 21, 2013, entitled "SYSTEM AND METHOD TO SUPER RESOLVE A USER SELECTED REGION OF INTEREST" which is incorporated herein by reference.

BACKGROUND

Aspects of the disclosure relate to image processing, and in particular, to systems and methods for super resolving portions of a scene. In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Devices such as digital cameras, phones with embedded cameras, or other camera or sensor devices may be used to create and store images of a scene. In many circumstances, there are numerous factors that limit and degrade the quality of captured images, such as atmospheric blurring, motion effects, camera blurring effects, and sampling effects. Super resolution refers to generating an image that is higher resolution than the resolution that the given camera sensor can capture. Super resolution is a resource intensive process, and super resolving an entire scene may take a larger amount of time or device resources than is preferable to a device user. Systems and methods of improving efficiency in a super resolution process may therefore be desirable.

BRIEF SUMMARY

Methods, devices, systems, and computer readable media for improving image quality for a user-selected region of interest are described. One embodiment may be a method including capturing, using a camera module of a device, at least one image of a scene; receiving, at the device, a user input identifying a region of interest, wherein the region of interest identifies a portion of the at least one image of the scene that is less than a complete area of the at least one image; and creating a higher resolution image of the region of interest using the at least one image of the scene by: creating a high resolution grid associated with the higher resolution image of the region of interest; identifying one or more low resolution grids associated with the portion of the at least one image of the scene, wherein each low resolution grid is associated with one image, and wherein each point of each low resolution grid comprises information captured by the camera module; determining an alignment between the high resolution grid and each of the one or more low resolution grids; and populating each point of the high resolution grid with information from a corresponding aligned pixel from the one or more low resolution grids.

Additional embodiments of such a method may function where the at least one image of the scene is captured prior to receipt of the user input identifying the region of interest; and wherein the user input identifying the region of interest is a touch screen input on a display output identifying the portion of the at least one image when the scene is displayed on the display output.

Additional embodiments of such a method may function where the at least one image of the scene is captured after receipt of the user input identifying the region of interest.

Additional embodiments of such a method may function where the at least one image of the scene consists of a single image of the scene, and wherein creating the higher resolution image of the region of interest comprises using patch redundancies identified in the single image of the scene to create the higher resolution image of the region of interest from the single image of the scene.

Additional embodiments of such a method may further comprise receiving at the device, prior to the capturing of the at least one image of the scene, a user input selecting a number of images to capture for use in creating the higher resolution image of the region of interest, wherein capturing the at least one image comprises automatically capturing the number of images of the scene; and wherein creating the higher resolution image of the region of interest comprises using each image of the number of images in a multi-frame super resolution process to create the higher resolution image of the region of interest without creating higher resolution image portions of the scene outside the region of interest.

Additional embodiments of such a method may further comprise displaying the higher resolution image of the region of interest on a display output of the device.

Additional embodiments of such a method may further comprise identifying free computer processing unit cycles available on the device while the higher resolution image of the region of interest is displayed on the display output of the device; and creating a second higher resolution image of at least a portion of the at least one image outside of the region of interest while the higher resolution image of the region of interest is displayed on the display output.

Additional embodiments of such a method may further comprise capturing sensor data for at least one sensor on the device; and associating the sensor data with the at least one image, wherein the sensor data is used to create the higher resolution image of the region of interest.

Additional embodiments of such a method may function where the sensor data comprises motion data from an accelerometer of the device.

Additional embodiments of such a method may further comprise displaying the higher resolution image of the region of interest as a preview image; receiving a user input in response to the displaying of the preview image requesting an additional increase in resolution of the higher resolution image of the region of interest; and creating an additional higher resolution image of the region of interest using the at least one image of the scene by: creating an additional higher resolution grid associated with the additional higher resolution image of the region of interest; identifying one or more high resolution grids comprising the high resolution grid; determining an alignment between the additional higher resolution grid and each of the one or more high resolution grids; and populating each point of the additional higher resolution grid with information from the corresponding aligned pixel from the one or more high resolution grids.

An additional embodiment may be a device comprising: a memory; a user input module; a camera module comprising a sensor; and a processor coupled to the memory and the camera module, the processor configured to: capture, using the camera module of the device, at least one image of a scene; receive, at the user input module, a user input identifying a region of interest, wherein the region of interest identifies a portion of the at least one image of the scene that is less than a complete area of the at least one image; and create a higher resolution image of the region of interest using the at least one image of the scene by: creating a high resolution grid associated with the higher resolution image of the region of interest; identifying one or more low resolution grids associated with the portion of the at least one image of the scene, wherein each low resolution grid is associated with one image, and wherein each point of each low resolution grid comprises information captured by the camera module; determining an alignment between the high resolution grid and each of the one or more low resolution grids; and populating each point of the high resolution grid with information from a corresponding aligned pixel from the one or more low resolution grids.

Additional embodiments of such a device may further comprise a display output; wherein the at least one image of the scene is captured prior to receipt of the user input identifying the region of interest; and wherein the user input module a touch screen input of the display output.

Additional embodiments of such a device may function where the processor is further configured to: display the higher resolution image of the region of interest on the display output of the device.

Additional embodiments of such a device may function where the processor is further configured to: identify free computer processing unit cycles available on the processor while the higher resolution image of the region of interest is displayed on the display output of the device; and create a second higher resolution image of at least a portion of the at least one image outside of the region of interest using the at least one image of the scene while the higher resolution image of the region of interest is displayed on the display output.

Additional embodiments of such a device may function where the at least one image of the scene consists of a single image of the scene, and wherein creating the higher resolution image of the region of interest comprises using patch redundancies identified in the single image of the scene to create the higher resolution image of the region of interest from the single image of the scene.

Additional embodiments of such a device may function where the processor is further configured to: receive at the device, prior to the capturing of the at least one image of the scene, a user input selecting a number of images to capture for use in creating the higher resolution image of the region of interest.

Additional embodiments of such a device may further comprise an accelerometer coupled to the processor, wherein the processor is further configured to: capture motion data from the accelerometer; associate the motion data with the at least one image; and create the higher resolution image of the region of interest using the motion data.

An additional embodiment may be a non-transitory computer readable storage medium comprising a set of instructions that, when executed by a processor coupled to the storage medium, cause a device improve an image quality for a user-selected region of interest, the instructions comprising: receiving, at the device, at least one image of a scene; receiving, at the device, a user input identifying a region of interest, wherein the region of interest identifies a portion of the at least one image of the scene that is less than a complete area of the at least one image; and creating a higher resolution image of the region of interest using the at least one image of the scene by: creating a high resolution grid associated with the higher resolution image of the region of interest; identifying one or more low resolution grids associated with the portion of the at least one image of the scene, wherein each low resolution grid is associated with one image, and wherein each point of each low resolution grid comprises information captured by a camera module; determining an alignment between the high resolution grid and each of the one or more low resolution grids; and populating each point of the high resolution grid with information from a corresponding aligned pixel from the one or more low resolution grids.

Additional embodiments may function where the instructions further comprise: identifying free computer processing unit cycles available on the device while the higher resolution image of the region of interest is displayed on a display output of the device; and creating a second higher resolution image of at least a portion of the at least one image that is outside of the region of interest while the higher resolution image of the region of interest is displayed on the display output.

Additional embodiments may function where the instructions further comprise: displaying the higher resolution image of the region of interest as a preview image; receiving a user input in response to the displaying of the preview image requesting an additional increase in resolution of the higher resolution image of the region of interest; and creating an additional higher resolution image of the region of interest using the at least one image of the scene by: creating an additional higher resolution grid associated with the additional higher resolution image of the region of interest; identifying one or more high resolution grids comprising the high resolution grid; determining an alignment between the additional higher resolution grid and each of the one or more high resolution grids; and populating each point of the additional higher resolution grid with information from the corresponding aligned pixel from the one or more high resolution grids.

Further embodiments will be apparent from the detailed description provided below.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

As mentioned above, embodiments described herein relate to super resolution, which is a process of creating an image that is higher resolution than the resolution of one or more source images from which the super resolved image is created. Embodiments described herein may provide for efficient use of device resources when super resolution is desired by enabling a user of a device to identify a region of interest in an image, and to use processing resources to create a super resolution image of only the region of interest, thus conserving processing resources and enabling quicker presentation of the super resolution image.

For example, with an image of a desktop with multiple sheets of paper, a smartphone user may activate a super resolution module that presents a preview of the image in a phone display with an interface to enable selection of a portion of the image including a single sheet of paper. This may enable a user to identify writing on the sheet of paper within the super resolved image that would not have been legible at the original image resolution.

Multiple types of super resolution are possible, and as referred to herein, super resolution may involve processes of deriving a super resolved image from a single source image, or from multiple source images. Examples of super resolution methods that may be used in accordance with embodiments discussed herein include multi-image noise reduction, sub-pixel filtering from multiple images, or Bayesian Induction using a single image.

A "scene" as referred to herein is a place or view of an area which is captured by a camera module of a device in one or more related images. Thus, related images of a movie captured by a device may be images of the same scene, even if each of the images are not covering the exact same space. In certain embodiments, a scene or portion of a scene may also thus refer to a place or view that comprises only a portion of the area or field of view captured by the device. Examples of sensors in a camera module or device may include semiconductor charge-coupled devices (CCD) and active pixel sensors in complementary metal-oxide-semiconductor (CMOS) or N-type metal oxide-semiconductor (NMOS).

Figure 1A:
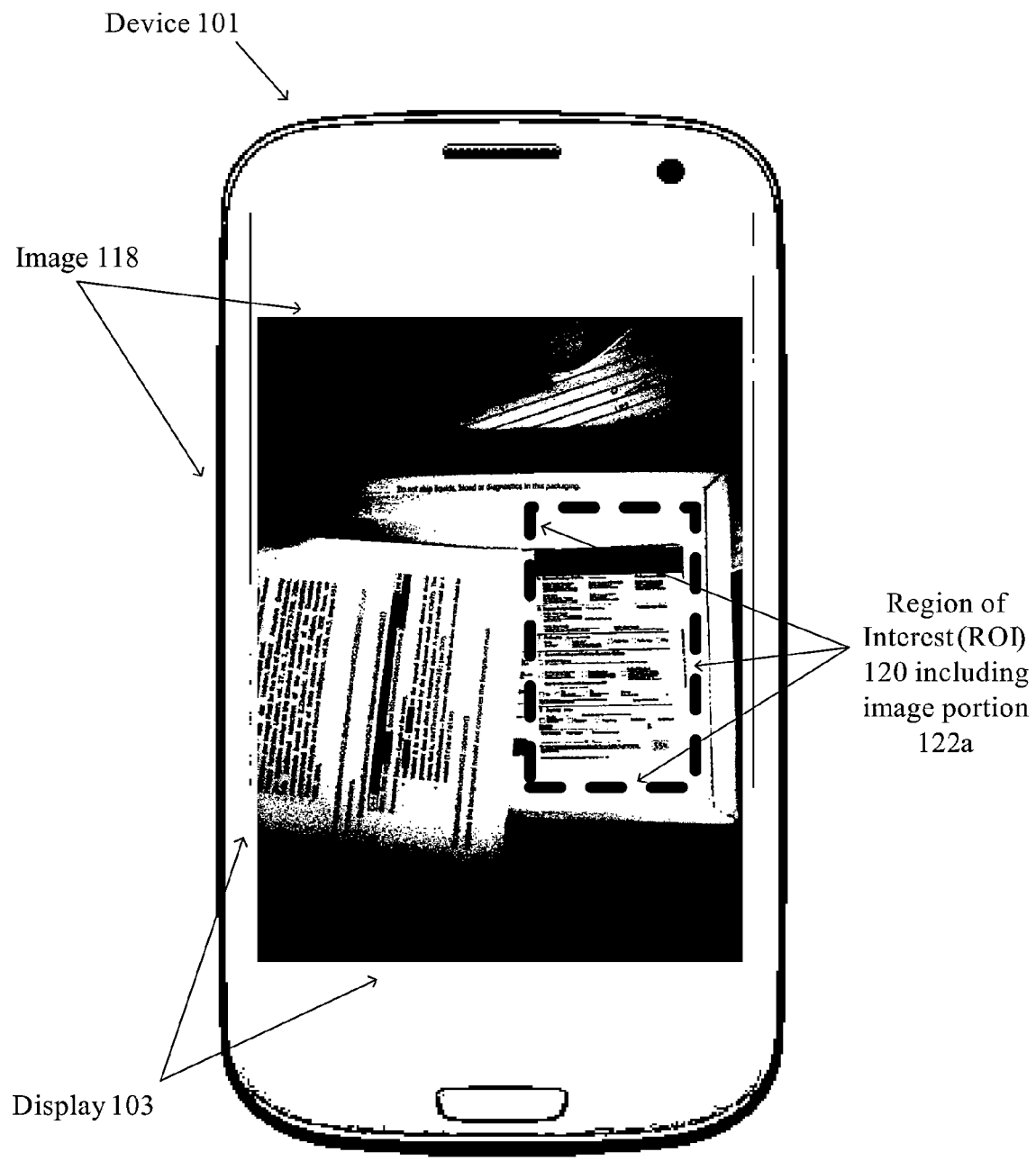
FIG. 1A illustrates aspects of a device comprising a camera that may perform super resolution in accordance with the embodiments described herein.

FIG. 1A illustrates one device 101 that includes display 103. As shown in FIG. 1A, display 103 is filled with an image 118 of a scene that may be captured by a camera module of device 101. Device 101 may simply be a dedicated camera device, or may be a multi-function device such as a smartphone with an integrated camera module comprising a sensor. In other embodiments, device 101 may be any such device such as a laptop, phone, tablet, phablet, a desktop with a plug-in camera device, or any other such computing device. On display 103, a dashed line is shown indicating a region of interest 120 that includes an image portion 122a which is a portion of the image 118 of the entire scene displayed on display 103. Region of interest 120 may be created when a user drags a finger across a capacitive touch screen of device 101 to create a rectangle aligned with the edges of display 103, where the corners of the region of interest 120 are defined by the initial and final touch inputs to the capacitive touch screen as a user input. In alternative embodiments, a super resolution module may be configured to automatically identify portions of an image or scene with details such as writing that the user has selected for automatic super resolution.

Figure 1B:
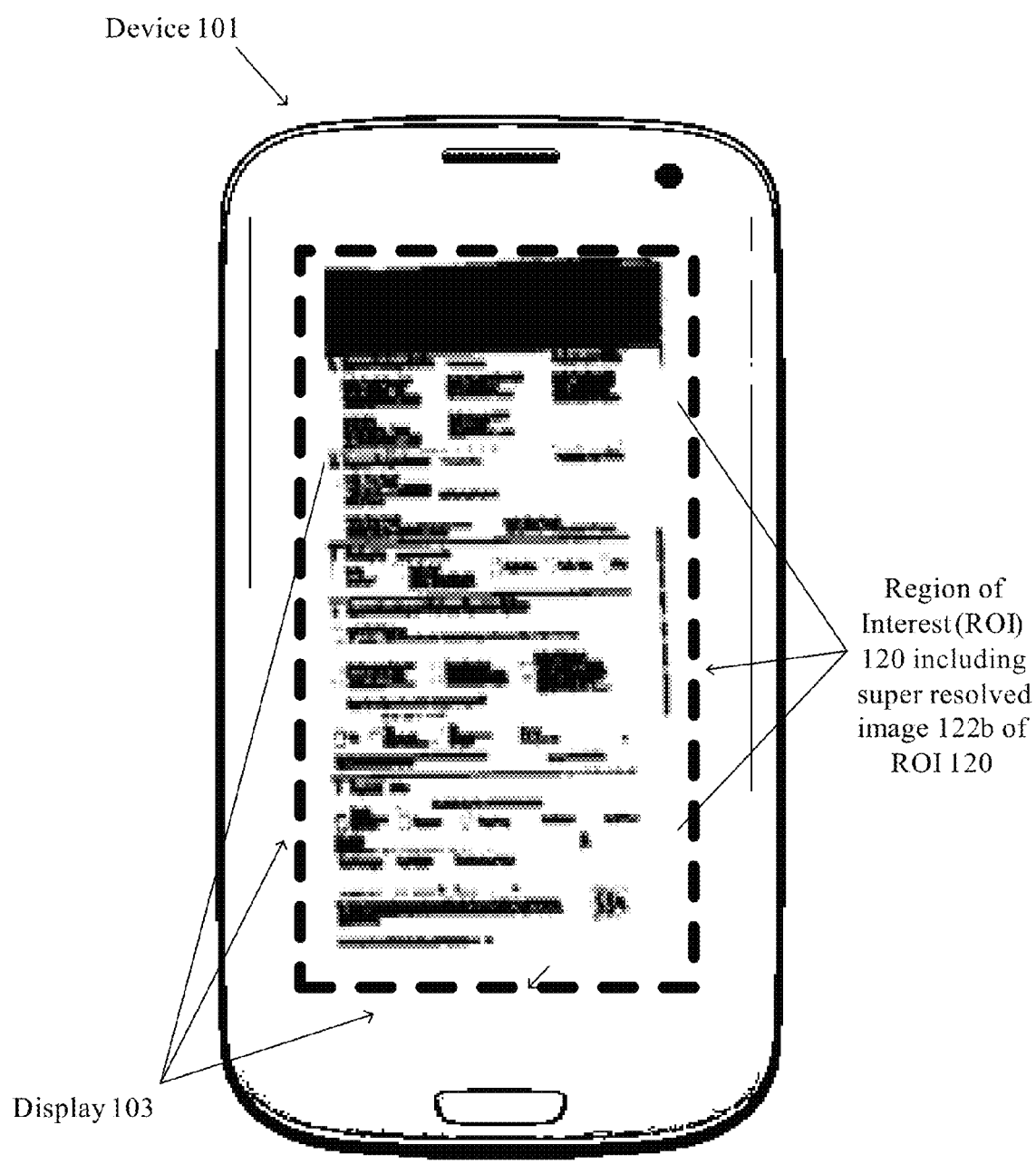
FIG. 1B illustrates aspects of a device comprising a camera that may perform super resolution in accordance with the embodiments described herein.

FIG. 1B then shows another potential embodiment of a device 101 where the identified region of interest 120 has been used in conjunction with one or more images including image 118 to create super resolved image 122b for region of interest 120. The super resolved image 122b is expanded to provide maximum detail on the display 103 of device 101. In certain embodiments, this may enable a user to determine if the quality is acceptable, and to capture additional images or select alternate super resolution settings for creation of another super resolution image of region of interest 120. In alternative embodiments, this may enable a user to inspect key portions of a scene while the additional portions of the scene captured in the images which are outside of region of interest 120 are super resolved using extra processing resources available on device 101. In still further embodiments, instead of the area of interest being expanded, the super resolved portion of the scene may be displayed in place as a higher resolution portion of the entire image, with the lower resolution portions left in place.

Figure 2:
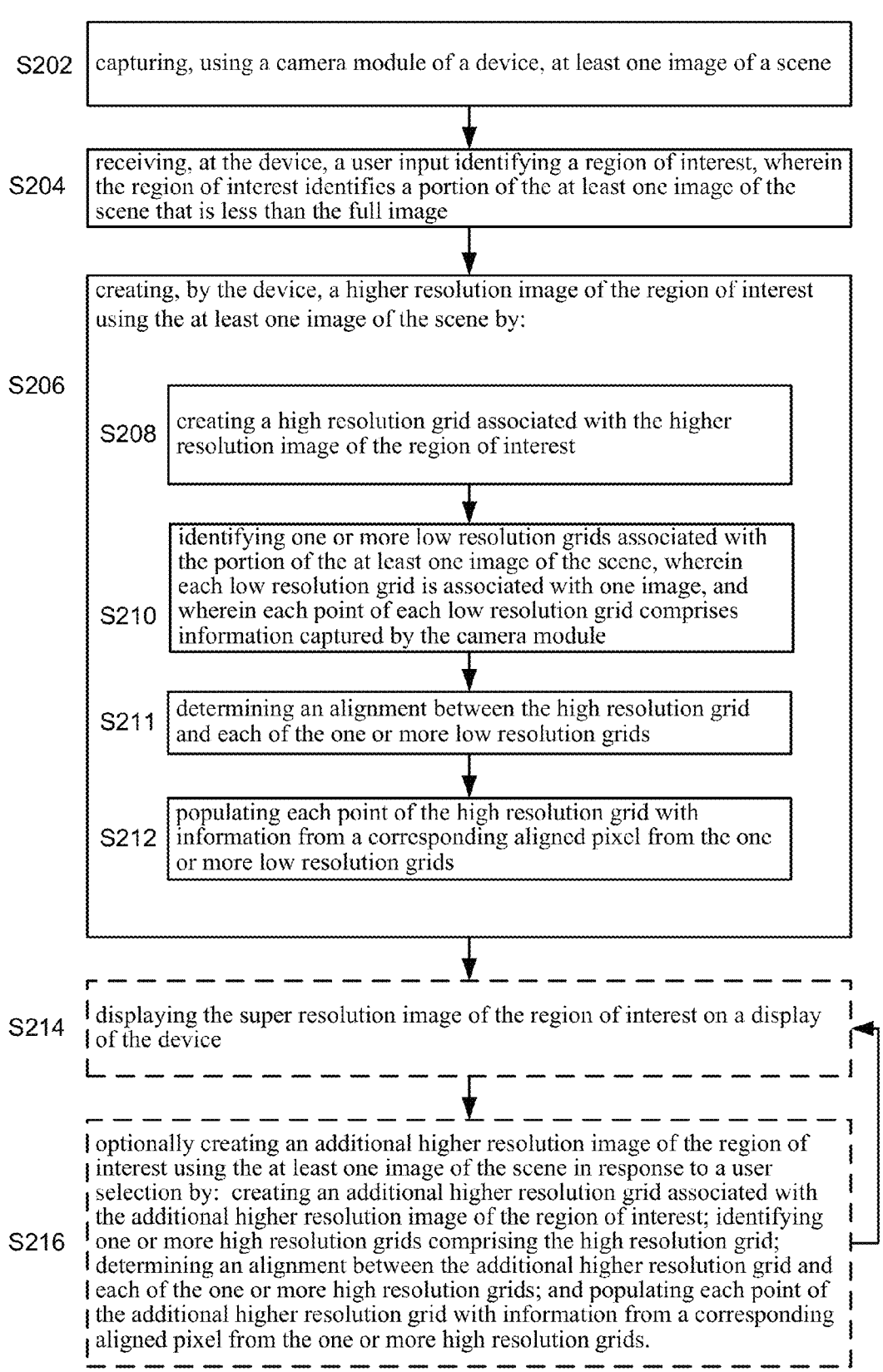
FIG. 2 describes a method for performing super resolution in accordance with the embodiments described herein.

FIG. 2 describes one method for super resolving a user-selected portion of an image. In this embodiment, the method begins with S202 by capturing, using a camera module of a device, at least one image of a scene. As described above, the scene refers to the area or image captured in one or more still or video images. This capture process may be part of a camera setting or a video setting of the device. S204 then describes receiving, at the device, a user input identifying a region of interest, wherein the region of interest identifies a portion of the at least one image of the scene that is less than the full image. As described above, this may be a touch screen selection followed by drawing a shape around the portion of the image to be super resolved. In certain embodiments, the user input may be accepted before the at least one image is captured. In other embodiments, the user input is accepted after the at least one image is captured. In still further embodiments, one or more images may be captured before the user input is received while additional images may be captured after the user input is received, and all the images may then be used to super resolve the area of interest.

S206 then describes creating, by the device, a higher resolution image of the region of interest using the at least one image of the scene. This process as detailed by the embodiment of FIG. 2 is further detailed by S208 through S212. S208 involves creating a high resolution grid associated with the higher resolution image of the region of interest. A "grid" here may refer to any matrix, data structure, or information that may be used to represent the information in a particular resolution of an image. For example, in an image that is 1028 pixels by 1028 pixels, the "grid" for this image may correspond to the grid created by the 1028 by 1028 pixels for this image at this resolution. The high resolution grid of S208 essentially corresponds to the super resolved image of the region of interest identified by the user in S204. In S210, one or more low resolution grids associated with the portion of the at least one image of the scene are identified by following the process above to identify the grid corresponding to the pixel grid of each image portion being used in the process. Each low resolution grid is associated with one image, and each point of each low resolution grid comprises information captured by the camera module. Each low resolution grid may be considered a standard resolution image. In S211, an alignment between the high resolution grid and each one of the one or more low resolution grids is identified. This enables any phase differences between multiple camera images to be identified and used in creating the super resolved image of the region of interest. In S212, each point of the high resolution grid is populated with information from a corresponding aligned pixel from the one or more low resolution grids if a corresponding pixel exists in the low resolution grids. In certain embodiments, this may allow creation of the high resolution image of the area of interest without processing intensive image processing of the area of interest. In further embodiments, this may simply be a first step which is then followed by additional image processing to create a high quality super resolved image of the region of interest.

Once the super resolved image of the region of interest is created, then in S214, a display of the device may display the super resolution image of the region of interest. As mentioned above, this may be presented in a full screen zoom of the display, or may be displayed in place of the original lower resolution region of interest portion with the surrounding portions of the scene presented in the original lower resolution. In still further embodiments, the super resolution image of the region of interest may be displayed in a preview panel that is part of a super resolution module. In such a module, the preview display may additionally include user interface options to further increase the resolution of the image of the region of interest. Thus, the high resolution grid may simply present an intermediate resolution image, and additional image improvement may be performed. As part of this optional additional improvement, the process of S206 may essentially be repeated in S216. As described, S216 may involve optionally creating an additional image with a resolution that is higher than the originally created high resolution image of the region of interest. This may be done by creating an additional higher resolution grid associated with the an additional higher resolution image of the region of interest. The system may identify one or more of the high resolution grids including the high resolution grid from S206. S216 then further involves determining an alignment between the additional higher resolution grid and each of the one or more high resolution grids. Finally, the additional higher resolution grid is populated with information from corresponding pixels of the one or more high resolution grid, in the same fashion that the high resolution grid was populated in S212. This process may be repeated any number of times to provide increasingly super resolved images of the region of interest. This process may only be constrained by the quality of the output display and image noise that is not compensated for by the super resolution process.

Figure 3:
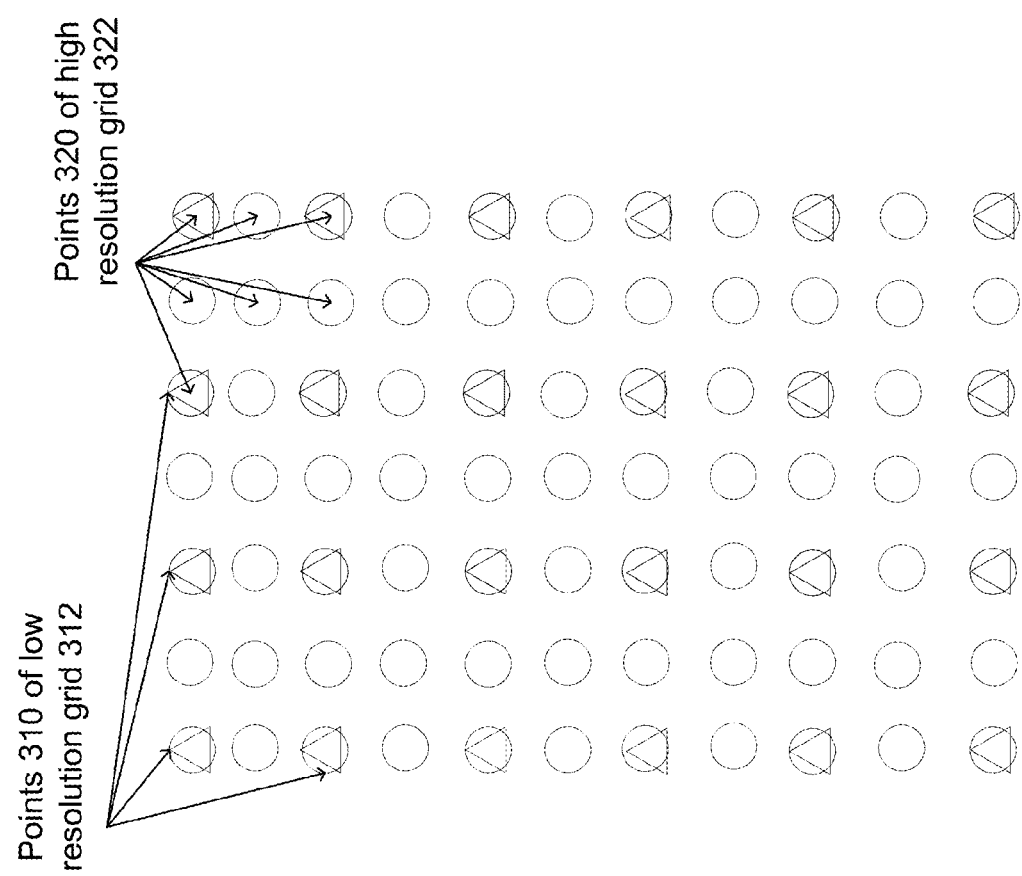
FIG. 3 illustrates aspects of systems and methods for performing super resolution using low and high resolution grids in accordance with embodiments described herein.

As a further illustration, FIG. 3 illustrates an example of a low resolution grid 312 that is aligned with a high resolution grid 322. Each point 310 of low resolution grid is illustrated by a triangle, and each point 320 of high resolution grid 322 is illustrated by a circle in FIG. 3. As described in the method of FIG. 2, each point 320 of high resolution grid 322 may initially be empty and separate from points 310. Points 310 may be considered pixel data or information from one picture image or one frame of a video. These points or pixels from each low resolution image may be used for the low resolution grid associated with each image. As part of the super resolution process, points 310 of low resolution grid 312 are aligned with points 320 of high resolution grid 322. As shown in FIG. 3, the low resolution grid 312 will cover the same area as high resolution grid 322, but will have a lower density of points in the same area. As part of the super resolution process, points 310 which match points 320 will be used to provide information for the corresponding points 320 of high resolution grid 322. This is shown in FIG. 3 as points having both a circle and a triangle. Directly using information from aligned corresponding points requires less processing load than other more processing-intensive processes for populating high resolution grid 322 to create a high resolution image for an area of interest. If multiple images are used, additional points from additional low resolution grids may then be used to provide information for the points 320 of high resolution grid 322 that are shown in FIG. 3 as not having associated points 310. In certain embodiments, all of the data for high resolution grid 322 may be created in this way. In other embodiments, points 320 which do not have direct corresponding points from low resolution grid 312 or another low resolution grid may be populated using data created from the surrounding points that do have information, using interpolation or other super resolution processes. This may include the use of multi-image noise reduction, sub-pixel filtering from multiple images, or Bayesian Induction to supplement the information taken directly from camera images as points in one or more low resolution grids such as low resolution grid 312.

Super resolution as described thus refers to generating an image that is higher resolution than the resolution that the given camera sensor can capture. Broadly speaking, super resolution achieves this by capturing one or multiple lower resolution images and then merging these images to generate a higher resolution image. However, the computationally intensive nature of this problem prohibits it from being an interactive feature on the devices with insufficient processing resources. This often means that the user captures the images with the mobile device, and then processes them offline on other resources.

Often, a user is interested in the high resolution details of only a part of the image. Thus, certain embodiments may address the above mentioned problem by allowing the user to select a region of interest (ROI), during the preview or after capturing the image, and then super resolving the selected ROI. This is achieved by letting the user select the region he/she is interested in super-resolving. This could be done either in the preview mode or after taking the first image. Multiple images (N) are read from the camera pipeline. Corresponding ROIs are selected from all the lower resolution images. These lower resolution ROIs are fed to the super resolution algorithm. The super resolution algorithm produces a higher resolution of the ROI selected by the user. The user is presented a higher resolution image of the ROI. This higher resolution image may be much better in quality than an alternate solution of showing digitally interpolated image. A number of images N is proportional to the super-resolution factor that the user is interested in.

In order to optimize the super resolution application for speed and memory, a system may merge the N (>1) low resolution images captured into few M (<N) images without modifying the observed pixel values. For instance, N here could be 16 and M could be 4. This can be achieved in the following way: if $Z_1, Z_2, \ldots, Z_n$ are the observed low resolution images, the goal is to obtain the higher resolution image Y by super-resolving $Z_1$ by a factor of s on each axis. Specifically, if $Z_1$ is W×H in dimensions, then Y has sW×sH dimensions. Here, $Z_2, \ldots, Z_n$ are sub-pixel shifted observations of the same scene with dimensions W×H. The image grid corresponding to the super-resolved image Y has $s^2$WH samples which are equal to the number of super resolved pixels. On the other hand, an image grid corresponding to the image $Z_1$ has WH pixels. When the image grid of $Z_1$ is scaled to match the larger image grid of Y without interpolating the observations, the image grid has WH number of grid points filled. In other words, $(s^2-1)$ WH grid points are empty in this upscaled high resolution grid of $Z_1$. Similarly, when other low resolution images are individually upscaled to match the size of Y's image grid, they also have WH grid locations occupied and $(s^2-1)$ WH grid locations empty. These individual image grids corresponding to upscaled $Z_i$'s are slightly shifted version of the same scene. In order to obtain Y, these image grids need to be aligned. One way of aligning them would be to use homographies. Alternatively, one could compute motion of the individual pixels (e.g., optical flow) to align these grids.

During the alignment, the total number of pixel values observed, which is equal to n×W×H, can be accumulated into M image grids of size sW×sH each. In one embodiment, this may be achieved by the following process. The grid location to which $k^{th}$ pixel of image $Z_i$ should be copied to is computed. This pixel in the one of the combined image grids is copied where this location is empty. This merges the N low resolution images into m larger image grids without modifying any of the observation.

In embodiments where the user is interested in super-resolving a specific ROI, the user-experience can be improved in two ways. While the user is selecting the ROI, there may be free CPU cycles. These CPU cycles can be used to estimate the transformation required to align the low resolution images. Two examples of such a transformation would be homography between the low resolution images, and optical flow as mentioned above. Once the ROI has been selected, the system may super resolve the ROI selected by the user. While the user is analyzing the details of the super resolved image, there again may be free CPU cycles. These free cycles may be used to super resolve the nearby region without impacting the user interaction with the image. This enables various embodiments to progressively super resolve the full image without a user waiting for the entire progressive super resolution, since at least a portion of the progressive portion has been completed while the user was observing an initial super resolved image of the ROI and determining whether to accept or reject the initial super resolved image. If the user requests additional super resolution after observing the initial super resolved image, the progressively resolved portion may be instantly presented to the user on request without processing delay. The user may then analyze neighboring parts of the ROI. This provides a seamless experience for the user for at least a portion of the neighboring analysis, although if the user requests an area larger than the progressively super resolved area, processing delay may still occur.

Embodiments described herein may enable users to interact with a scene and image and thus provide users higher resolution details of the region they are interested in. Certain embodiments may significantly reduce the super resolution time for a mobile device with limited processing resources, allowing super resolution to be an interactive feature on a mobile device such as a mobile phone. Embodiments may enable immediate feedback for the users of the achievable resolution of the ROI. This may enable users to recapture the images if the user is unsatisfied with the previous version, rather than waiting until a later time when additional processing resources are available but when it may not be possible to take additional or alternative low resolution images. Embodiments herein enable a mobile device to super resolve an image shortly after the original images are taken, and thus to enable additional or alternative images to be taken if the super resolved image is not acceptable.

Figure 4:
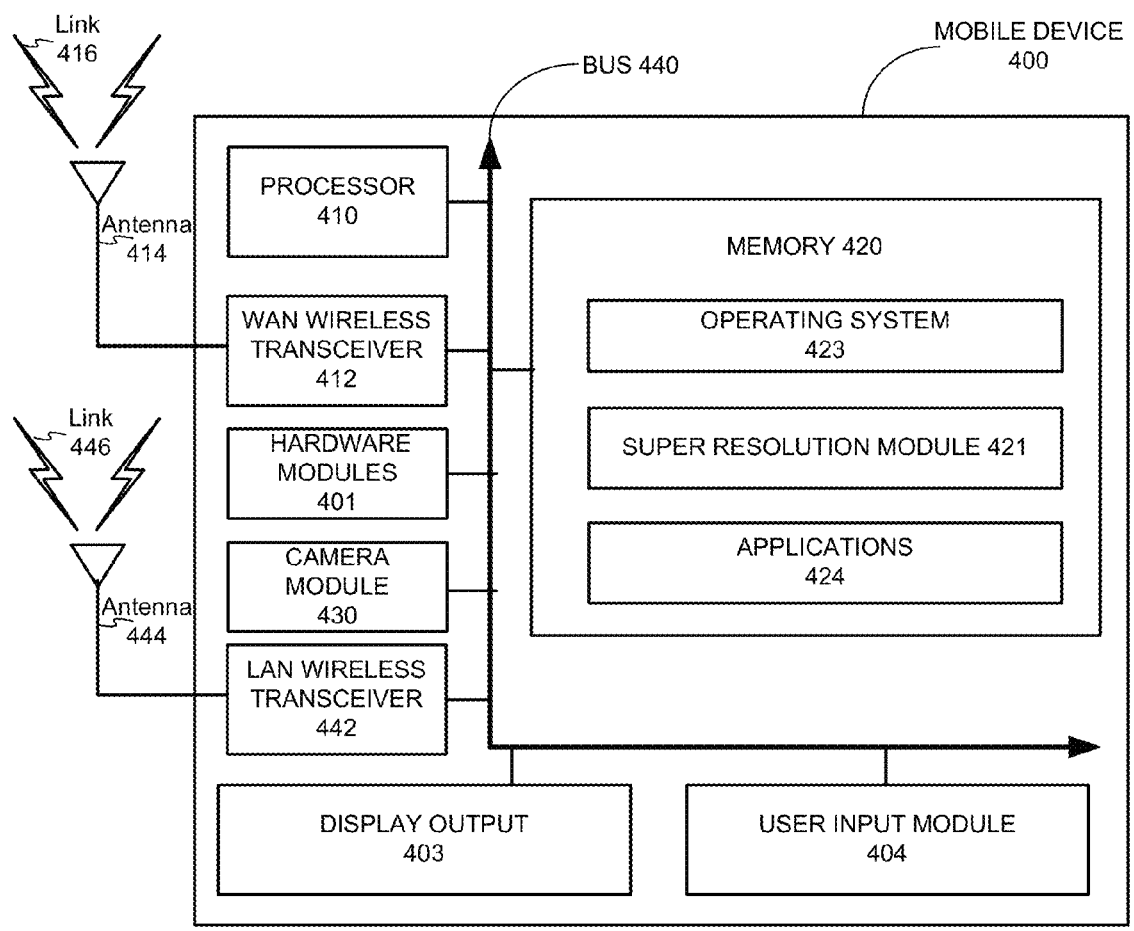
FIG. 4 illustrates one example of a device for use with various embodiments.

FIG. 4 now describes one implementation of a mobile device 400 according to certain embodiments. As described above, devices such as mobile device 400 may include a laptop, mobile phone, tablet, phablet, head mounted display, dedicated camera device, digital video recorder, desktop with a plug-in camera device, or any other such computing device. Mobile device 400 of FIG. 4 may be used to super resolve a portion of an image using super resolution module 421, camera module 430, processor 410, and any other hardware, software, and/or firmware functionality that may be part of mobile device 400. Mobile device 400 may also display the super resolved image along with a user interface. In certain embodiments, super resolution as described herein may be implemented using a processor 410 along with computer-readable instructions that may be stored in memory 420. Super resolution module 421 may include a set of user selections, settings, or thresholds for acceptable characteristics of an output super resolved image, as well as processes for selecting image inputs and resolutions and measuring image and scene characteristics to achieve the acceptable characteristics for an output super resolved image.

In certain embodiments, where a device such as mobile device 400 is to implement super resolution in accordance with the embodiments described herein, one or more relevant pieces of information may be received from links 416 or 446 in addition to information from camera module 430 or super resolution module 421, and any relevant information may then be stored in memory 420, either as part of an application 424, or in a non-transitory storage of memory 420.

In the embodiment shown at FIG. 4, mobile device 400 includes processor 410 configured to execute instructions for performing operations at a number of components and can be, for example, a general-purpose processor or microprocessor suitable for implementation within a portable electronic device. Processor 410 is communicatively coupled with a plurality of components within mobile device 400. To realize this communicative coupling, processor 410 may communicate with the other illustrated components across a bus 440. Bus 440 can be any subsystem adapted to transfer data within mobile device 400. Bus 440 can be a plurality of computer buses and include additional circuitry to transfer data.

Memory 420 may be coupled to processor 410. In some embodiments, memory 420 offers both short-term and long-term storage and may in fact be divided into several units. Memory 420 may be volatile, such as static random access memory (SRAM) and/or dynamic random access memory (DRAM), and/or non-volatile, such as read-only memory (ROM), flash memory, and the like. Furthermore, memory 420 can include removable storage devices, such as secure digital (SD) cards. Thus, memory 420 provides storage of computer-readable instructions, data structures, program modules, and other data for mobile device 400. In some embodiments, memory 420 may be distributed into different hardware modules 401.

In some embodiments, memory 420 stores a plurality of application modules, which may be any number of applications 424. Application modules contain particular instructions to be executed by processor 410. In alternative embodiments, other hardware modules 401 may additionally execute certain applications 424 or parts of applications 424. In certain embodiments, memory 420 may additionally include secure memory, which may include additional security controls to prevent copying or other unauthorized access to secure information such as private or secure photographs.

In some embodiments, memory 420 includes an operating system 423. Operating system 423 may be operable to initiate the execution of the instructions provided by application modules and/or manage other hardware modules 401 as well as interfaces with communication modules which may use WAN wireless transceiver 412 and LAN wireless transceiver 442 to receive information from link 416 via antenna 414 and/or link 446 via antenna 444, respectively. Operating system 423 may be adapted to perform other operations across the components of mobile device 400 including threading, resource management, data storage control and other similar functionality.

In some embodiments, mobile device 400 includes a plurality of other hardware modules 401. Each of other hardware modules 401 is a physical module within mobile device 400. However, while each of hardware modules 401 is permanently configured as a structure, a respective one of hardware modules 401 may be temporarily configured to perform specific functions or temporarily activated. A common example is an application module that may program camera module 430 for shutter release and image capture. A respective one of hardware modules 401 can be, for example, an accelerometer, a Wi-Fi transceiver, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth®[1] transceiver, a cellular transceiver, a magnetometer, a gyroscope, an inertial sensor (e.g., a module that combines an accelerometer and a gyroscope), an ambient light sensor, a relative humidity sensor, or any other similar module operable to provide sensory output and/or receive sensory input. In some embodiments, one or more functions of the hardware modules 401 may be implemented in software. In various embodiments, information from any such hardware modules 401 may be integrated with information from camera module 430 by super resolution module 421 to output a super resolved image to display unit 403.

Mobile device 400 may include a component such as a wireless communication module which may integrate antenna 414 and antenna 444 and wireless transceivers 412 and 442 with any other hardware, firmware, or software necessary for wireless communications to enable communications via link 416 and link 446. Such a wireless communication module may be configured to receive signals from various devices such as data sources via networks and access points. In addition to other hardware modules 401 and applications 424 in memory 420, mobile device 400 may have a display output 403 and a user input module 404. Display output 403 graphically presents information from mobile device 400 to the user. This information may be derived from one or more applications 424, one or more hardware modules 401, a combination thereof, or any other suitable means for resolving graphical content for the user (e.g., by operating system 423). For example, super resolution module 421 may interact with camera module 430 and operating system 423 to present an image and a user interface on display output 403. The user interface may describe which inputs at user input module 404 may be selected by a user to super resolve a portion of the image. In certain embodiment, portions of the user interface may appear in response to a touch input on a touchscreen outlining a ROI. The user interface may further describe possible user inputs for incrementally increasing the super resolution while updates to the image are displayed on display output 403. Display output 403 can be liquid crystal display (LCD) technology, light-emitting polymer display (LPD) technology, or some other display technology. In some embodiments, display output 403 is a capacitive or resistive touch screen and may be sensitive to haptic and/or tactile contact with a user. In such embodiments, the display output 403 can comprise a multi-touch-sensitive display. In such embodiments, user input module 404 and display output 403 may be the same module. User input module 404 may receive user input selections for such inputs as a number of low resolution images to be used in creating a super resolved image, or feedback on whether a displayed super resolved image has sufficient quality or whether additional super resolution should be performed. Display output 403 may then be used to display the final image comprising the super resolved image output by super resolution module 421 for display on display output 403.

Additional embodiments of a mobile device may further comprise various portions of computing devices as are detailed below with respect to FIG. 6 and networks as detailed in FIG. 7.

Figure 5:
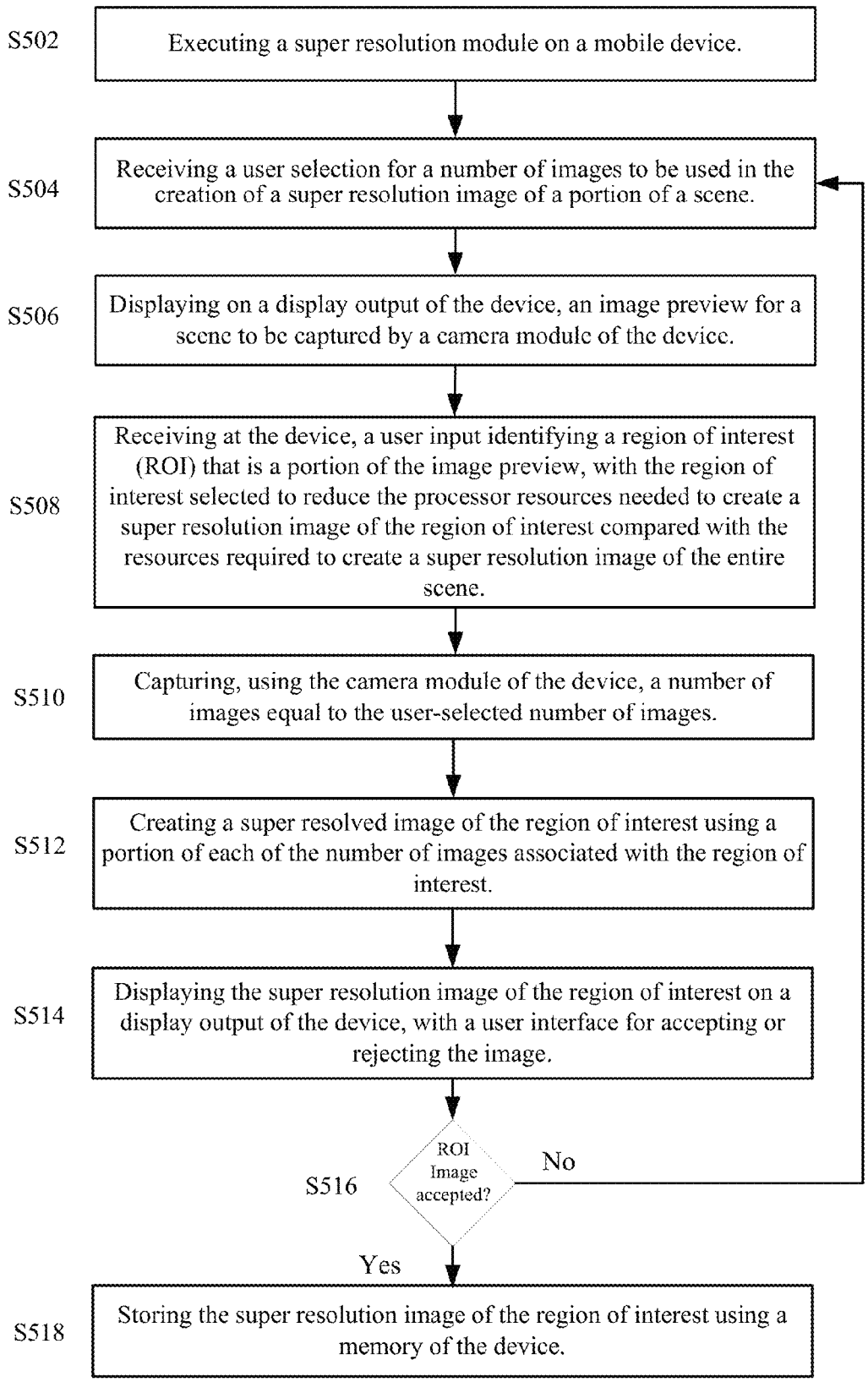
FIG. 5 describes a method for performing super resolution in accordance with certain embodiments described herein.

FIG. 5 describes a detailed method by which a device such as a mobile device may implement partial super resolution of an image. In S502, a super resolution module on a mobile device is executed. This may be in direct response to a user selection, or may be an automatic execution in response to a user-selected option or in response to a determination that an image captured by a camera module meets certain criteria for initiating super resolution. In S504, the device receives a user selection for one or more images to be used in the creation of a super resolution image of a portion of a scene. This corresponds to the number of low resolution input images and corresponding low resolution grids that may be used as part of the super resolution process. This may again be a direct selection by the user, or an automatic selection in response to previously selected criteria.

In S506, an image preview may be displayed on a display output of the device. In certain embodiments, this may comprise one or more images that have been captured by a camera module and stored in a memory, or may comprise a direct image currently in view of the camera module prior to any images being stored in a memory of the device.

In S508, a user input identifying a region of interest that is a portion of the image preview is received. This may be: a drawing on the preview when the user input is a touch screen; a text input identifying image coordinates; or a previously selected set of criteria that is accessed to identify the region of interest. The region of interest is selected to reduce the processor resources needed to create a super resolution image of the region of interest compared with the resources required to create a super resolution image of the entire scene or entire image shown in the image preview.

In S510, the selected number of images from S504 are captured and stored for access by the super resolution module. In S512, a super resolved image of the region of interest is created using at least a portion of each of the selected number of images. This process may be similar or identical to the process described in FIG. 3. In S514, the super resolution image of the region of interest is displayed on the display output of the device, with a user interface for accepting or rejecting the image. In S516, if the image is accepted, the process proceeds to S518. If the image is rejected, the process returns to S504 and additional images or processing options may be selected to improve the potential quality of the image for the region of interest. If the process proceeds, then in S518, the super resolution image of the region of interest is stored in the memory of the device. It may then be output or displayed by the device.

In further embodiments, a device may use a selected area to prioritize super resolution of a portion of an image, and may automatically begin super resolving the remaining portion of the image after the selected portion is displayed in a super resolved format to the user. In still further embodiments, a network may be used to access remote computing resources for some or all of the super resolution process. In still further embodiments, if extra processing resources are available during an image preview step, then the device may estimate the time or resources necessary for super resolution of the image and/or portions of the image prior to the region of interest being selected by the user. This information may be presented to the user, or may be used to improve processing of the super resolution for the region of interest or the entire image.

Figure 6:
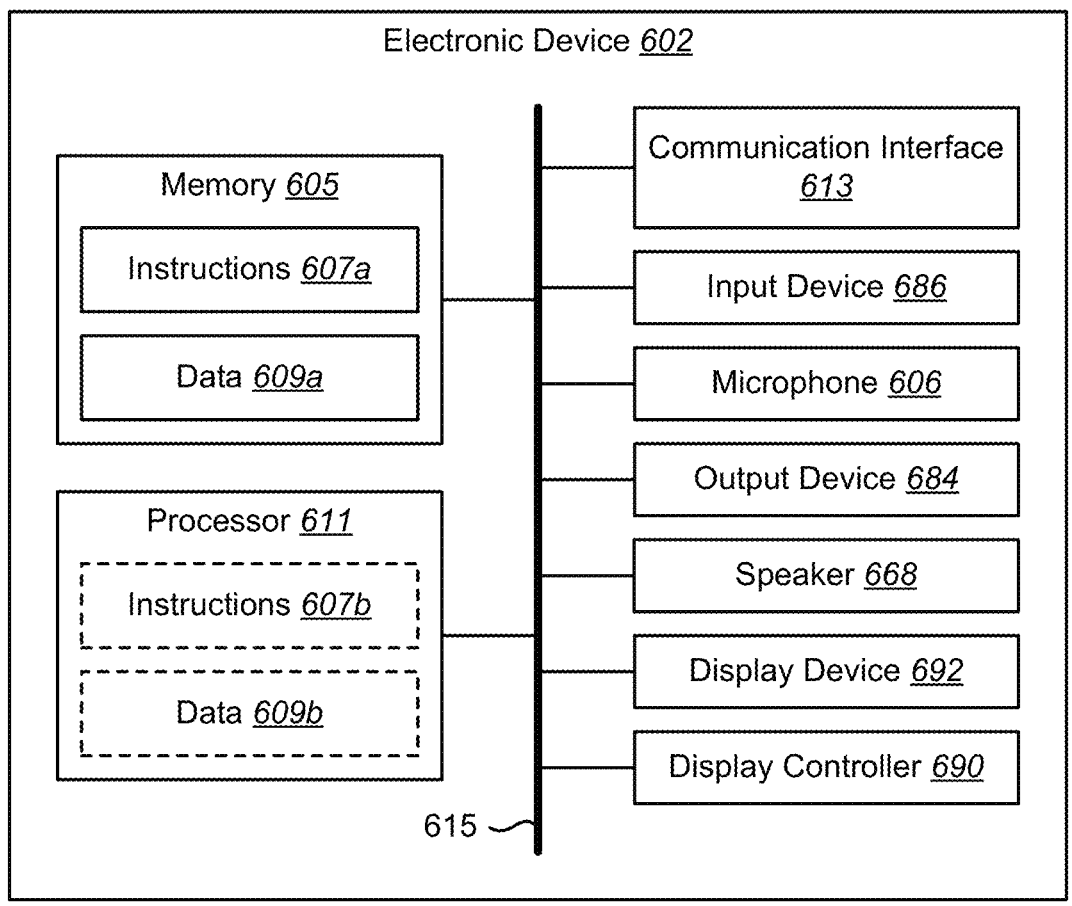
FIG. 6 is one implementation of a computing device which may be used in accordance with certain embodiments.

FIG. 6 illustrates various components that may be utilized in an electronic device 602. Device 602 or any component of device 602 may be used as part of a device that implements super resolution in accordance with the embodiments described herein, or may describe a device that is networked with a device that implements super resolution in accordance with such embodiments. The illustrated components may be located within the same physical structure or in separate housings or structures. The electronic device 602 described in connection with FIG. 6 may be implemented in accordance with at least one of the electronic devices and the wireless communication device described herein. The electronic device 602 includes a processor 611. The processor 611 may be a general-purpose single- or multi-chip microprocessor (e.g., an ARM), a special purpose microprocessor (e.g., a digital signal processor (DSP)), a microcontroller, a programmable gate array, etc. The processor 611 may be referred to as a central processing unit (CPU). Although just a single processor 611 is shown in the electronic device 602 of FIG. 6, in an alternative configuration, a combination of processors (e.g., an ARM and DSP) could be used. Any processor capable of determining grids from the pixels of a low resolution image and creating a super resolved portion of an image may be used in different embodiments, or of performing the elements of FIG. 2, FIG. 5, or of any other such super resolution process that works in accordance with the implementations described herein.

The electronic device 602 also includes memory 605 in electronic communication with the processor 611. That is, the processor 611 can read information from and/or write information to the memory 605. The memory 605 may be any electronic component capable of storing electronic information. The memory 605 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 609a and instructions 607a may be stored in the memory 605. The instructions 607a may include at least one program, routine, sub-routine, function, procedure, etc. In various embodiments, these may comprise a computer program product which is storing instructions in memory 605, where the instructions may be executed by processor 611 to cause a device to perform super resolution as described by FIG. 2, FIG. 5, or any other super resolution process that works in accordance with the implementations described herein. The instructions 607a may include a single computer-readable statement or many computer-readable statements. The instructions 607a may be executable by the processor 611 to implement at least one of the methods described above. Executing the instructions 607a may involve the use of the data 609a that is stored in the memory 605. FIG. 6 shows some instructions 607b and data 609b being loaded into the processor 611 (which may come from instructions 607a and data 609a).

The electronic device 602 may also include at least one communication interface 613 for communicating with other electronic devices. The communication interface 613 may be based on wired communication technology, wireless communication technology, or both. Examples of different types of communication interfaces 613 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth. In certain embodiments, the communication interface 613 may be used receive updates for a super resolution module operating on electronic device 602, or to communicate information about regions of interest or user selections to a server providing services related to super resolution. In still further embodiments, images, portions of images, or super resolved portions of images may be communicated via communication interface 613.

The electronic device 602 may also include at least one input device 686 and at least one output device 684. Examples of different kinds of input devices 686 include a keyboard, mouse, microphone, remote control device, button, joystick, trackball, touchpad, lightpen, etc. For instance, the electronic device 602 may include at least one microphone 606 for capturing acoustic signals. In one configuration, a microphone 606 may be a transducer that converts acoustic signals (e.g., voice, speech) into electrical or electronic signals. Examples of different kinds of output devices 684 include a speaker, printer, etc. For instance, the electronic device 602 may include at least one speaker 668. In one configuration, a speaker 668 may be a transducer that converts electrical or electronic signals into acoustic signals. One specific type of output device that may be typically included in an electronic device 602 is a display device 692. Display devices 692 used with configurations disclosed herein may utilize any suitable image projection technology, such as a cathode ray tube (CRT), liquid crystal display (LCD), light-emitting diode (LED), gas plasma, electroluminescence, or the like. A display controller 690 may also be provided for converting data stored in the memory 605 into text, graphics, and/or moving images (as appropriate) shown on the display device 692. In various embodiments, display device 692 may display both low resolution images and super resolved images or a combination of both, along with a user interface, as described with respect to display output 403. Input device 686 may be used for accepting user commands related to selection of regions of interest and super resolution settings as described with respect to user input module 404.

The various components of the electronic device 602 may be coupled together by at least one bus, which may include a power bus, a control signal bus, a status signal bus, a data bus, etc. For simplicity, the various buses are illustrated in FIG. 6 as a bus system 615. It should be noted that FIG. 6 illustrates only one possible configuration of an electronic device 602. Various other architectures and components may be utilized.

In various embodiments as described herein, computing devices may be networked in order to communicate information. For example, mobile devices 100 and 300 may be networked to receive information as described above. Further, network 930 may be more complex and involve many different devices. Additionally, each of these elements may engage in networked communications with other devices such as web servers, databases, or computers which provide access to information to improved audio performance as described herein.

Figure 7:
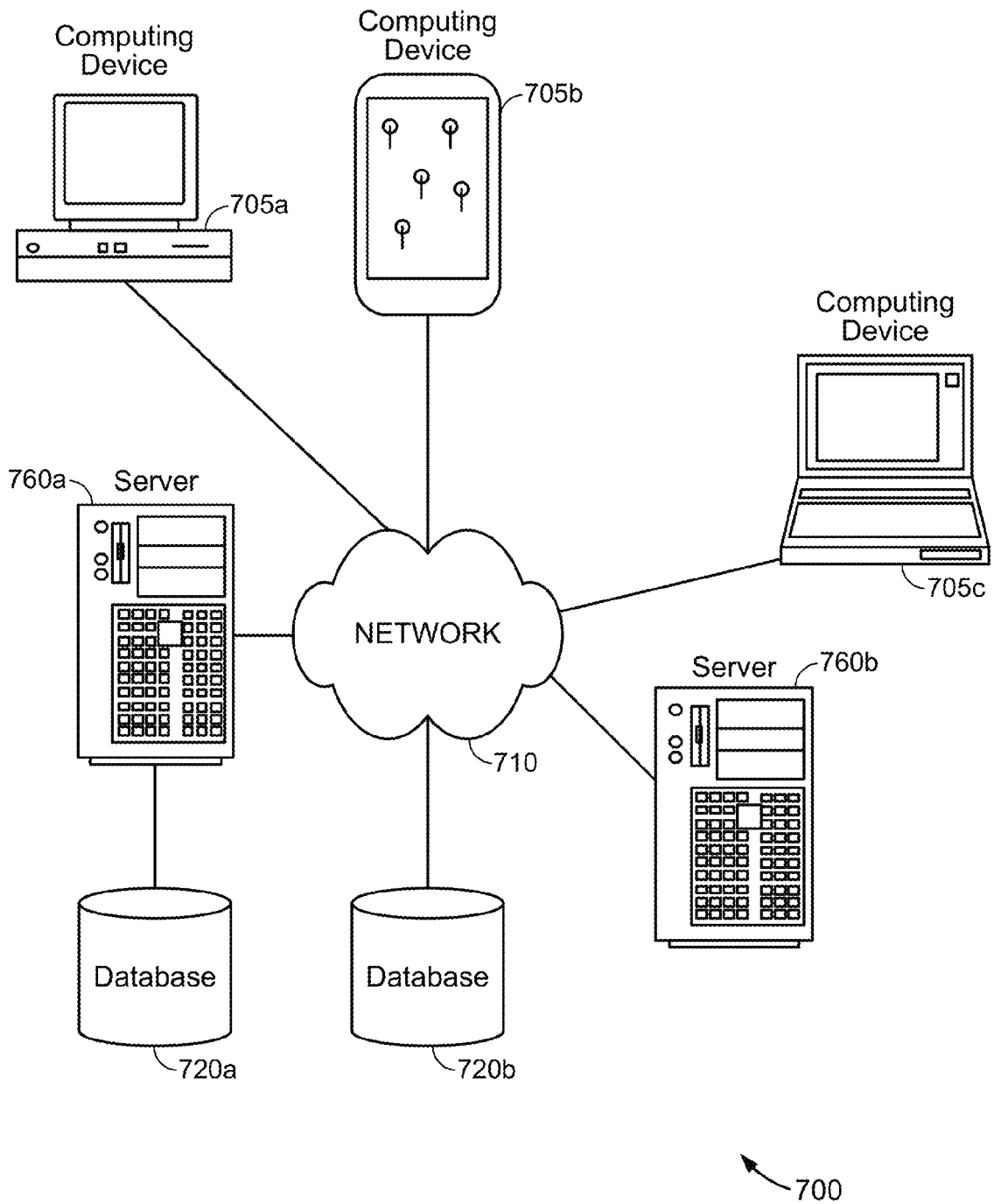
FIG. 7 is one implementation of a networked computer system according to certain embodiments.

FIG. 7 illustrates a schematic diagram of a system 700 of networked computing devices that can be used in accordance with various embodiments to enable certain functionality for a device that may implement super resolution in accordance with embodiments described herein. In various embodiments, elements of system 700 may function to collect image or user selection information, to process portions of an image, or to provide any potential support to the super resolution process implemented on a device. For example, in certain embodiments, a region of interest may be super resolved on a mobile device, and the remaining portions of a scene may be super resolved using networked resources.

The system 700 can include one or more user computing devices 705. The user computing devices 705 can be general-purpose personal computers similar to the device of FIG. 6 (including, merely by way of example, personal computers and/or laptop computers running any appropriate flavor of Microsoft® Windows®[2] and/or Mac OS®[3] operating systems) and/or workstation computers running any of a variety of commercially-available UNIX®[4] or UNIX-like operating systems. These user computing devices 705 can also have any of a variety of applications, including one or more applications configured to perform methods of the invention, as well as one or more office applications, database client and/or server applications, and web browser applications. Alternatively, the user computing devices 705 can be any other electronic device, such as a thin-client computer, Internet-enabled mobile telephone, and/or personal digital assistant (PDA), capable of communicating via a network (e.g., the network 710 described below) and/or displaying and navigating web pages or other types of electronic documents. Although the exemplary system 700 is shown with three user computing devices 705a-c, any number of user computing devices can be supported.

Certain embodiments of the invention operate in a networked environment, which can include a network 710. The network 710 can be any type of network familiar to those skilled in the art that can support data communications using any of a variety of commercially-available protocols, including, without limitation, TCP/IP, SNA, IPX, AppleTalk®[3], and the like. Merely by way of example, the network 710 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 702.11 suite of protocols, the Bluetooth protocol known in the art, and/or any other wireless protocol; and/or any combination of these and/or other networks. Network 710 may include access points for enabling access to network 710 by various computing devices.

In certain embodiments, implementations may include modules which may be networked together via a network such as network 710. For example, in certain embodiments, a camera such as camera module 430 may be part of a different device than processor 410. Image data for a low resolution image may be communicated from a camera module such as camera module to a processor in a separate device such as processor 410 in such embodiments. In such an embodiment implementing the method of FIG. 2, S202 would be performed by a first device, possibly in response to a networked communication from a second device. The second device would then perform S204 through S212. In other embodiments, any number of different devices may be involved in such a process.

Embodiments of the invention can include one or more servers 760. Each of the servers 760 may be configured with an operating system, including, without limitation, any of those discussed above, as well as any commercially (or freely) available server operating systems. Each of the servers 760 may also be running one or more applications, which can be configured to provide services to one or more user computing devices 705 and/or other servers 760. In certain embodiments, server 760 may provide a super resolution module such as super resolution module 421 to a device such as mobile device 400 via a network 710.

Merely by way of example, one of the servers 760 may be a web server, which can be used, merely by way of example, to process requests for web pages or other electronic documents from user computing devices 705. The web server can also run a variety of server applications, including HTTP servers, FTP servers, CGI servers, database servers, Java®[5] servers, and the like. In some embodiments of the invention, the web server may be configured to serve web pages that can be operated within a web browser on one or more of the user computing devices 705 to perform methods of the invention. Such servers may be associated with particular IP addresses, or may be associated with modules having a particular URL, and may thus store secure navigation modules which may interact with a mobile device such as mobile device 400 to provide secure indications of geographic points as part of location services provided to mobile device 400. In certain embodiments, such a web server may provide a super resolution module or updates to a super resolution module to a mobile device to enable the mobile device to implement super resolution in accordance with the embodiments described herein.

In accordance with further embodiments, one or more servers 760 can function as a file server and/or can include one or more of the files (e.g., application code, data files, etc.) necessary to implement methods of various embodiments incorporated by an application running on a user computing device 705 and/or another server 760. Alternatively, as those skilled in the art will appreciate, a file server can include all necessary files, allowing such an application to be invoked remotely by a user computing device 705 and/or server 760. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720. In one embodiment, a database 720 may store user selections or user criteria for super resolution. When a super resolution module is downloaded to a mobile device, previously selected user criteria specific to the mobile device or user may be included. The location of the database(s) 720 is discretionary: merely by way of example, a database 720a might reside on a storage medium local to (and/or resident in) a server 760*a* (and/or a user computing device 705). Alternatively, a database 720*b* can be remote from any or all of the user computing devices 705 or servers 760, so long as the database 720*b* can be in communication (e.g., via the network 710) with one or more of these. In a particular set of embodiments, a database 720 can reside in a storage-area network ("SAN") familiar to those skilled in the art. (Likewise, any necessary files for performing the functions attributed to the user computing devices 705 or servers 760 can be stored locally on the respective computer and/or remotely, as appropriate.) In one set of embodiments, the database 720 can be a relational database, such as an Oracle®[5] database that is adapted to store, update, and retrieve data in response to SQL-formatted commands. The database might be controlled and/or maintained by a database server, for example, like the one described above.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner.

In the above description, reference numbers have sometimes been used in connection with various terms. Where a term is used in connection with a reference number, this may be meant to refer to a specific element that is shown in at least one of the figures. Where a term is used without a reference number, this may be meant to refer generally to the term without limitation to any particular figure.

The terms "couple" or "link" and any variations thereof may indicate a direct or indirect connection between elements. For example, a first element coupled to a second element may be directly connected to the second element, or indirectly connected to the second element through another element.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application-specific integrated circuit (ASIC), a programmable logic device (PLD), a field-programmable gate array (FPGA), etc. The term "processor" may refer to a combination of processing devices, e.g., a combination of a digital signal processor (DSP) and a microprocessor, a plurality of microprocessors, at least one microprocessor in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to at least one of programs, routines, sub-routines, functions, procedures, etc. "Instructions" and "code" may comprise a single computer-readable statement or many computer-readable statements.

It should be noted that at least one of the features, functions, procedures, components, elements, structures, etc., described in connection with any one of the configurations described herein may be combined with at least one of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The presentation of the described configurations is provided to enable any person skilled in the art to make or use the methods and other structures disclosed herein. The flowcharts, block diagrams and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than 8 kilohertz, such as 6, 16, 32, 44.1, 48, or 192 kHz).

An apparatus as disclosed herein (e.g., any device configured to perform a technique as described herein) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (e.g., within a chipset including two or more chips).

One or more elements of the various implementations of the apparatus disclosed herein may be implemented in whole or in part as one or more sets of instructions arranged to execute on one or more fixed or programmable arrays of logic elements, such as microprocessors, embedded processors, intellectual property (IP) cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of a method as disclosed herein, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general-purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general-purpose processor or other digital signal processing unit. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM, or in any other form of storage medium known in the art. An illustrative storage medium is coupled to the processor such that the processor can read information from, and write information to, the storage medium. In the alternative, the storage medium may be integral to the processor. The processor and the storage medium may reside in an ASIC, and the ASIC may reside in a user terminal. In the alternative, the processor and the storage medium may reside as discrete components in a user terminal. The term "computer-program product" refers to a computing device or processor in combination with code or instructions (e.g., a "program") that may be executed, processed or computed by the computing device or processor.

It is noted that the various methods disclosed herein may be performed by an array of logic elements, such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor-readable medium or transmitted by a computer data signal embodied in a carrier wave over a transmission medium or communication link.

The implementations of methods, schemes, and techniques disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments. Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™[6], where disks usually reproduce data magnetically, while discs reproduce data optically with lasers. Combinations of the above should also be included within the scope of computer-readable media.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structures in common (e.g., a processor used to execute portions of code corresponding to different elements at different times, a set of instructions executed to perform tasks corresponding to different elements at different times, or an arrangement of electronic and/or optical devices performing operations for different elements at different times).

It is to be understood that the claims are not limited to the precise configuration and components illustrated above. Various modifications, changes and variations may be made in the arrangement, operation and details of the systems, methods, and apparatus described herein without departing from the scope of the claims.

APPENDIX TO THE SPECIFICATION

[1] The "Bluetooth" word mark and logos are registered trademarks owned by Bluetooth SIG, Inc. Other trademarks and trade names are those of their respective owners.

[2] "Microsoft" and "Windows" are either registered trademarks or trademarks of Microsoft Corporation in the United States and/or other countries.

[3] "Mac OS" and "AppleTalk" are registered trademarks of Apple, Inc., registered in the U.S. and other countries.

[4] "UNIX" is a registered trademark of The Open Group.

[5] "Java" and "Oracle" are registered trademarks of Oracle and/or its affiliates. Other names may be trademarks of their respective owners.

[6] "Blu-ray Disc" is a trademark owned by Blu-ray Disc Association (BDA).

What is claimed is:

1. A method of improving image quality for a user-selected region of interest comprising:
   capturing, using a camera module of a device, a plurality of images of a scene;
   receiving, at the device, a user input identifying a region of interest in an image of the plurality of images, wherein the region of interest identifies a portion of the image of the scene that is less than a complete area of the image, wherein at least one image of the plurality of images of the scene is captured by the camera module after receipt of the user input identifying the region of interest; and
   creating a higher resolution image of the region of interest using the plurality of images of the scene by:
      creating a high resolution grid associated with the higher resolution image of the region of interest;
      identifying one or more low resolution grids associated with the images of the scene, wherein each low resolution grid is associated with one image, and wherein each point of each low resolution grid comprises information captured by the camera module;

determining an alignment between the high resolution grid and each of the one or more low resolution grids;

determining locations of the region of interest in each image of the plurality of images based on the alignment; and populating points of the high resolution grid with information from a corresponding aligned pixel from the one or more low resolution grids within the respective regions of interest of each image.

2. The method of claim 1 wherein at least one image of the plurality of images of the scene is captured prior to receipt of the user input identifying the region of interest;

wherein the user input identifying the region of interest is a touch screen input on a display output identifying the portion of the plurality of images when the scene is displayed on the display output.

3. The method of claim 1 further comprising:

receiving at the device, prior to the capturing of the plurality of images of the scene, a user input selecting a number of images to capture for use in creating the higher resolution image of the region of interest, wherein capturing the plurality of images comprises automatically capturing the number of images of the scene; and wherein creating the higher resolution image of the region of interest comprises identifying the region of interest in each image of the number of images and creating the higher resolution image of the region of interest using the respective region of interest in each image of the number of images.

4. The method of claim 1 further comprising:

capturing sensor data for at least one sensor on the device; and associating the sensor data with the plurality of images, wherein the sensor data is used to create the higher resolution image of the region of interest.

5. The method of claim 1, further comprising:

determining motion of one or more pixels between two or more images of the plurality of images; and creating the higher resolution image of the region of interest based on the motion.

6. The method of claim 1 further comprising:

displaying the higher resolution image of the region of interest as a preview image;

receiving a user input in response to the displaying of the preview image requesting an additional increase in resolution of the higher resolution image of the region of interest; and creating a second higher resolution image of the region of interest using the plurality of images of the scene by:

creating a second higher resolution grid associated with the second higher resolution image of the region of interest;

identifying one or more high resolution grids;

determining an alignment between the second higher resolution grid and each of the one or more high resolution grids; and populating each point of the second higher resolution grid with information from the corresponding aligned pixel from the one or more high resolution grids.

7. The method of claim 1, further comprising, while receiving a selection of the region of interest, estimating a transformation to align two or more images of the plurality of images during free computer processing unit cycles.

8. The method of claim 1, wherein determining the locations of the region of interest in each image of the plurality of images is based on the alignment between the high resolution grid and each of the one or more low resolution grids using homographies or computed motion of individual pixels in the plurality of images.

9. The method of claim 1 further comprising:

displaying the higher resolution image of the region of interest on a display output of the device.

10. The method of claim 9 further comprising:

creating a second higher resolution image of at least a portion of the plurality of images outside of the region of interest.

11. A device comprising:

a memory;

a user input module;

a camera module comprising a sensor; and a processor coupled to the memory and the camera module, the processor configured to:

capture, using a camera module of a device, a plurality of images of a scene;

receive, at the user input module, a user input identifying a region of interest in an image of the plurality of images, wherein the region of interest identifies a portion of the image of the scene that is less than a complete area of the image, wherein at least one image of the plurality of images of the scene is captured by the camera module after receipt of the user input identifying the region of interest; and create a higher resolution image of the region of interest using the plurality of images of the scene by:

creating a high resolution grid associated with the higher resolution image of the region of interest;

identifying one or more low resolution grids associated with the images of the scene, wherein each low resolution grid is associated with one image, and wherein each point of each low resolution grid comprises information captured by the camera module;

determining an alignment between the high resolution grid and each of the one or more low resolution grids;

determining locations of the region of interest in each image of the plurality of images based on the alignment; and populating points of the high resolution grid with information from a corresponding aligned pixel from the one or more low resolution grids within the respective regions of interest of each image.

12. The device of claim 11 wherein the processor is further configured to:

receive at the device, prior to the capturing of the plurality of images of the scene, a user input selecting a number of images to capture for use in creating the higher resolution image of the region of interest.

13. The device of claim 11 wherein the processor is further configured to:

determine motion of one or more pixels between two or more images of the plurality of images; and create the higher resolution image of the region of interest based on the motion.

14. The device of claim 11 further comprising:

a display output;

wherein at least one of the plurality of images of the scene is captured prior to receipt of the user input identifying the region of interest; and wherein the user input module a touch screen input of the display output.

15. The device of claim 14 wherein the processor is further configured to:
display the higher resolution image of the region of interest on the display output of the device.

16. The device of claim 15 wherein the processor is further configured to:
identify free computer processing unit cycles available on the processor while the higher resolution image of the region of interest is displayed on the display output of the device; and
create a second higher resolution image of at least a portion of the plurality of images outside of the region of interest using the plurality of images of the scene while the higher resolution image of the region of interest is displayed on the display output.

17. A non-transitory computer readable storage medium comprising a set of instructions that, when executed by a processor coupled to the storage medium, cause a device improve an image quality for a user-selected region of interest, the instructions configured to cause the processor to:
capture, by a camera module at the device, a plurality of images of a scene;
receive, at the device, a user input identifying a region of interest in an image of the plurality of images, wherein the region of interest identifies a portion of the image of the scene that is less than a complete area of the image, wherein at least one image of the plurality of images of the scene is captured by the camera module after receipt of the user input identifying the region of interest; and
create a higher resolution image of the region of interest using the plurality of images of the scene by:
create a high resolution grid associated with the higher resolution image of the region of interest;
identify one or more low resolution grids associated with the images of the scene, wherein each low resolution grid is associated with one image, and wherein each point of each low resolution grid comprises information captured by a camera module;
determine an alignment between the high resolution grid and each of the one or more low resolution grids;
determine locations of the region of interest in each image of the plurality of images based on the alignment; and
populate points of the high resolution grid with information from a corresponding aligned pixel from the one or more low resolution grids within the respective regions of interest of each image.

18. The non-transitory computer readable medium of claim 17 wherein the instructions are further configured to cause the processor to:
identify free computer processing unit cycles available on the device while the higher resolution image of the region of interest is displayed on a display output of the device; and
create a second higher resolution image of at least a portion of the plurality of images that is outside of the region of interest while the higher resolution image of the region of interest is displayed on the display output.

19. The non-transitory computer readable medium of claim 17 wherein the instructions are further configured to cause the processor to:
display the higher resolution image of the region of interest as a preview image;
receive a user input in response to the displaying of the preview image requesting an additional increase in resolution of the higher resolution image of the region of interest; and
create an additional higher resolution image of the region of interest using the plurality of images of the scene by:
create an additional higher resolution grid associated with the additional higher resolution image of the region of interest;
identify one or more high resolution grids comprising the high resolution grid;
determine an alignment between the additional higher resolution grid and each of the one or more high resolution grids; and
populate each point of the additional higher resolution grid with information from the corresponding aligned pixel from the one or more high resolution grids.

20. The non-transitory computer readable medium of claim 17 wherein the instructions are further configured to cause the processor to:
display the higher resolution image of the region of interest as a preview image with a user interface for accepting or rejecting the higher resolution image of the region of interest.

21. A device for improving image quality for a user-selected region of interest comprising:
means for capturing a plurality of images of a scene;
means for receiving a user input identifying a region of interest in an image of the plurality of images, wherein the region of interest identifies a portion of the image of the scene that is less than a complete area of the image, wherein at least one image of the plurality of images of the scene is captured by the camera module after receipt of the user input identifying the region of interest; and
means for creating a high resolution grid associated with a higher resolution image of the region of interest;
means for identifying one or more low resolution grids associated with the images of the scene, wherein each low resolution grid is associated with one image, and wherein each point of each low resolution grid comprises information captured by the means for capturing the plurality of images of the scene;
means for determining an alignment between the high resolution grid and each of the one or more low resolution grids;
means for determining locations of the region of interest in each image of the plurality of images based on the alignment; and
means for populating points of the high resolution grid with information from a corresponding aligned pixel from the one or more low resolution grids within the respective regions of interest of each image to create a super resolved image of the region of interest.

22. The device of claim 21 further comprising:
means for displaying the plurality of images of the scene and for displaying the super resolved image of the region of interest.

23. The device of claim 21 wherein the means for capturing the plurality of images of the scene comprises a camera.

24. The device of claim 21 further comprising:
means for updating the super resolved image of the region of interest in response to a user input.

25. The device of claim 21 further comprising:
means for displaying a user interface for accepting or rejecting the super resolved image of the region of interest; and
means for storing the super resolved image of the region of interest in response to a user input accepting the super resolved image of the region of interest.

26. A method of improving image quality for a user-selected region of interest comprising:
capturing, using a camera module of a device, one or more images of a scene;
receiving, at the device, a user input identifying a region of interest in an image of the one or more images, wherein the region of interest identifies a portion of the image that is less than a complete area of the image; and
iteratively, based on user input, creating successively-higher resolution images of the region of interest using the one or more images of the scene by, for each iteration:
creating a high resolution grid associated with a next higher resolution image of the region of interest;
identifying one or more low resolution grids associated with the images of the scene or the previous higher resolution image of the region of interest;
determining an alignment between the high resolution grid and each of the one or more low resolution grids; and
populating points of the high resolution grid with information from a corresponding aligned pixel from the one or more low resolution grids.

* * * * *